(12) United States Patent
Bruchmann et al.

(10) Patent No.: US 6,437,276 B1
(45) Date of Patent: Aug. 20, 2002

(54) HORIZONTALLY POSITIONED, ENCAPSULATED HIGH-VOLTAGE CIRCUIT BREAKER

(75) Inventors: Bernd Bruchmann; Manfred Meinherz, both of Berlin; Bernd Raeth, Baerenklau; Michael Suhr, Glienicke, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/890,192
(22) PCT Filed: Jan. 25, 2000
(86) PCT No.: PCT/DE00/00250
§ 371 (c)(1),
(2), (4) Date: Jul. 30, 2001
(87) PCT Pub. No.: WO00/45487
PCT Pub. Date: Aug. 3, 2000

(30) Foreign Application Priority Data

Jan. 28, 1999 (DE) .......................................... 299 02 208

(51) Int. Cl.⁷ ........................ H01H 33/02; H01H 33/28
(52) U.S. Cl. ........................ 218/152; 218/153; 218/154
(58) Field of Search ........................ 218/44, 45, 68–84, 218/118, 119, 120, 121, 140, 152, 153, 154

(56) References Cited

U.S. PATENT DOCUMENTS 4,016,383 A    4/1977   Nicoloso ..................... 218/84
4,019,007 A    4/1977   Friedrich et al.
4,075,447 A    2/1978   Rostron ....................... 218/65
4,215,256 A    7/1980   Sakaguchi et al. ............ 218/82
4,968,875 A    11/1990  Thuries

FOREIGN PATENT DOCUMENTS

| DE | 29 29 054   | 1/1980  |           |
| DE | 298 06 652 U1 | 7/1998  |           |
| DE | 19815152 C1 | 11/1999 | H01H/33/02 |
| EP | 0 878 816 A2 | 11/1998 |           |

Primary Examiner—Ramon M. Barrera
(74) Attorney, Agent, or Firm—Morrison & Foerster LLP

(57) ABSTRACT

A three-phase-encapsulated high-voltage circuit breaker, arranged horizontally and with a compact construction, is intended to have as small a physical height as possible and to require as small an installation area as possible. To this end, the tubular switch enclosure is provided at each of its ends with a connecting flange for horizontal connection of a surface-mounted enclosure. The drive device is attached to a mounting flange in the casing region of the switch enclosure. The circuit breaker poles are supported via insulating posts on the casing of the switch enclosure and are in the form of bushings for the coupling elements which are connected to the drive device. The power movement of a lever drive arranged downstream of a coupling element passes via a direction-changing lever which is mounted in the respective circuit breaker pole. The internal construction of such a circuit breaker may also be applied to single-phase-encapsulated circuit breakers.

13 Claims, 3 Drawing Sheets

HORIZONTALLY POSITIONED, ENCAPSULATED HIGH-VOLTAGE CIRCUIT BREAKER

CLAIM FOR PRIORITY

This application claims priority to International Application No. PCT/DE00/00250 which was published in the German language on Jan. 25, 2000.

TECHNICAL FIELD OF THE INVENTION

The invention relates to the field of electrical power distribution, and in particular, to the structural design of a three-phase-encapsulated gas-insulated high-voltage circuit breaker.

BACKGROUND OF THE INVENTION

In a known three-phase-encapsulated high-voltage circuit breaker, three circuit breaker poles are arranged side by side, either in a horizontal plane or at the ends of a triangle, in an oval or cylindrical enclosure. Each are fixed to one end of the enclosure by means of a supporting cylinder made of insulating material. The outgoers of the three phases are passed through enclosure stubs which are arranged in the casing region of the enclosure. The outgoer of the central phase is arranged in a vertical plane, while the outgoers for the two other phases are arranged on both sides of it, and form an acute angle, open at the top, with one another. Each connecting stub, which is surrounded by a current transformer, has a tubular element fitted to it, in which a switch disconnector, possibly combined with an earthing switch, is located. An overhead line bushing is connected to this tubular element. The drive for the high-voltage circuit breaker is arranged at one end of the enclosure, with a vertically running drive rod transmitting a linear movement via a direction-changing drive to a torsion shaft, which is coupled to other direction-changing drives by means of horizontally running drive rods. These drive rods are coupled to the moving contacts of the circuit breaker poles (EP 0878 816 A2).

In another known high-voltage circuit breaker, the circuit breaker poles are attached to supporting insulators in the region of the ends of the switch enclosure via the phase conductors which lead to the poles, and these supporting insulators are supported on connecting stubs arranged on the casing side. The phase conductors may in this case have associated current transformers. A splitting module is fitted directly to one connecting stub and is fitted with three outdoor bushings, while the surface-mounted enclosure is fitted to the other connecting stubs, which enclosure contains a switch disconnector and is fitted with a quick-action earther and a voltage transformer (EP 0878 816 A2).

Furthermore, a three-phase-encapsulated gas-insulated high-voltage circuit breaker with a vertical configuration has also been proposed, in which each circuit breaker pole comprises two pole pieces, which are supported by insulating posts on one supporting body at the lower and upper ends of the enclosure. The insulating posts are in the form of tubes, with one drive rod passing through each of the tubes of the upper pole elements. The drive rods, which are connected in a hinged manner at one of their ends to switching rods, are connected at their other end to a transverse member which is connected in a hinged manner to a drive lever. This drive lever is connected to a crank, which can be pivoted by a drive (DE 198 15 152 C2).

A high-voltage circuit breaker is known for single-phase-encapsulated outdoor high-voltage switching devices, in which a horizontally arranged, tubular encapsulation enclosure, which contains two interrupter units, has associated encapsulation modules, which are adjacent at both ends and are fitted with a current transformer. The moving contact of the respective interrupter unit is supported via a hollow insulating cylinder on the casing of the encapsulation enclosure, with an insulating drive rod passing through the insulating cylinder and being coupled to the drive device which is arranged underneath the switch enclosure (DE 2929054 A1).

SUMMARY OF THE INVENTION

In one embodiment of the invention, there is a three-phase-encapsulated high-voltage circuit breaker with a horizontal configuration, in which three circuit breaker poles are arranged side by side within a tubular switch enclosure. The circuit breaker includes two pole elements which are arranged insulated from a switch enclosure and a first pole element, which is supported in an insulating manner on the switch enclosure, and is fitted with a moving contact piece and a second pole element is fitted with a stationary contact piece, moving contact pieces of the circuit breaker poles have an associated common drive device, which is arranged outside the switch enclosure and is coupled via separate lever drives to the moving contact pieces, and surface-mounted enclosures are provided in the region of ends of the switch enclosure, through which surface-mounted enclosures current feeders to the circuit breaker poles are passed, wherein the two ends of the switch enclosure are each provided with a connecting flange for horizontal connection of a surface-mounted enclosure, the drive device is arranged on the casing surface of the switch enclosure and is attached to a mounting flange in the casing region of the switch enclosure, each pole element of the circuit breaker pole is supported via in each case one insulating post on the casing of the tubular switch enclosure, and the insulating posts for the pole elements which include the moving contact pieces are in the form of bushings for coupling elements, which are connected to the drive device, of the lever drive, each lever drive has a two-armed direction-changing lever, whose rotary bearing is supported via the insulating post on the casing of the switch enclosure.

In another aspect of the invention, each surface-mounted enclosure has a first connecting flange facing the switch enclosure and a second connecting flange facing away from the switch enclosure, wherein the second connecting flange of at least one of the two surface-mounted enclosures has a diameter which is less than the diameter of the first connecting flange, and the surface-mounted enclosure is in the form of a current transformer module.

In another aspect of the invention, the insulating posts for the pole elements which include the moving contact pieces are fitted to a transverse member which is supported on the casing of the switch enclosure in the region of the mounting flange.

In yet another aspect of the invention, the coupling elements of the lever drives are connected in a hinged manner, underneath the transverse member, to a yoke, which is connected via a drive rod to the drive device.

In another aspect of the invention, each coupling element is connected in a hinged manner to one of the two lever arms, and the other of the two lever arms is connected in a hinged manner via a coupling element, which is mounted such that it can pivot, to an axially guided coupling element, the axially guided coupling element guided such that it can slide in the movement direction of the moving contact piece, and is coupled to the moving contact piece.

In another aspect of the invention, each pole element which includes a moving contact piece is in the form of an enclosure, which surrounds the direction-changing lever and the axially guided coupling element and has a wall in which the respective direction-changing lever is mounted, and which is fitted on the associated insulating post.

In still another aspect of the invention, the pole elements which include a stationary contact piece are of identical construction to the pole elements which include a moving contact piece.

In another aspect of the invention, the pole elements of one circuit breaker pole are mechanically connected to one another by an insulating spacer, the insulating spacer comprises at least one rod which is parallel to the axis of the pole elements.

In another aspect of the invention, the circuit breaker includes a conductor element fitted to each pole element and provides the transition from the current connections of the pole elements to current feeders, which are arranged in a triangular shape.

In another embodiment of the invention, there is a single-phase-encapsulated high-voltage circuit breaker with a horizontal configuration, in which a circuit breaker pole which is arranged inside a tubular switch enclosure. The circuit breaker includes, for example, two pole elements which are arranged insulated from the switch enclosure, one of the pole elements is fitted with a moving contact piece while the other pole element is fitted with a stationary contact piece, the moving contact piece of the circuit breaker pole has an associated drive device, which is arranged outside the switch enclosure, on its casing surface, and is attached to a mounting flange and is coupled, inside the switch enclosure, via a lever drive to the moving contact piece, wherein horizontally adjacent surface-mounted enclosures are provided on ends of the switch enclosure, through which surface-mounted enclosures the current feeders to the circuit breaker pole are passed, each pole element of the circuit breaker pole is supported via one insulating post on the casing of the tubular switch enclosure, the insulating post for the pole element which includes the moving contact pieces is in the form of a bushing for a coupling element, which is connected to the drive device, of the lever drive, each lever drive has a two-armed direction-changing lever whose rotary bearing is supported via the insulating post on the casing of the switch enclosure, and the coupling element is connected in a hinged manner to one of the lever arms of the two-armed direction-changing lever, while the other lever arm of the direction-changing lever is connected in a hinged manner via a coupling element, which is mounted such that it can pivot, to an axially guided coupling element, and the axially guiding coupling element is guided such that it can slide in the movement direction of the moving contact piece, and is coupled to the moving contact piece.

In another aspect of the invention, the pole element which includes the moving contact piece is formed as an enclosure which surrounds the direction-changing lever and the axially guided coupling element, and in whose wall the respective direction-changing lever is mounted, and which is fitted to the associated insulating post.

In another aspect of the invention, the pole element which includes the stationary contact piece is of identical construction to the pole element which includes a moving contact piece.

In yet another aspect of the invention, the pole elements of the circuit breaker pole are mechanically connected to one another by an insulating spacer in which case the insulating spacer comprises at least one rod which is parallel to the axis of the pole elements.

BRIEF DESCRIPTION OF THE DRAWINGS

Two exemplary embodiments of the invention are shown in FIGS. 1 to 5, in which.

DETAILED DESCRIPTION OF THE PREFERRED EMBODIMENTS

Figure 1:
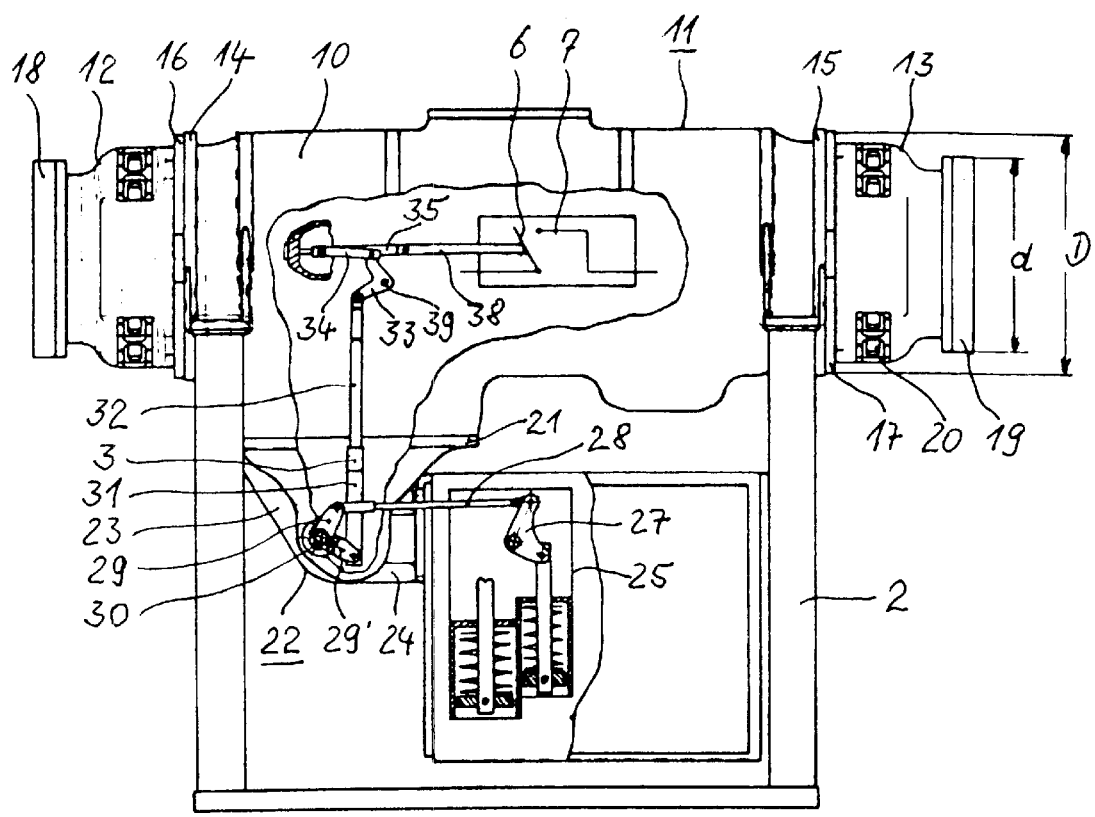
FIG. 1 shows a view of a three-pole circuit breaker, showing power transmitted from the drive device.

The invention relates to the field of electrical power distribution and is applicable to the structural design of a three-phase-encapsulated gas-insulated high-voltage circuit breaker, in which three circuit breaker poles are arranged side by side inside a horizontally arranged tubular switch enclosure, and in which the moving contact pieces of the circuit breaker poles have an associated common drive device which is arranged outside the switch enclosure. The invention is also applicable to a single-phase-encapsulated high-voltage circuit breaker.

The invention discloses a switch such that, while having a compact configuration, it has as small a physical height as possible and requires as small an installation area as possible.

The invention provides that the two ends of the tubular switch enclosure are each provided with a connecting flange for horizontal connection of a surface-mounted enclosure, that the drive device is arranged on the casing surface of the switch enclosure and is attached to a mounting flange in the casing region of the switch enclosure, that each pole element of a circuit breaker pole is supported via in each case one insulating post on the casing of the tubular switch enclosure, that the insulating posts for the pole elements which contain the moving contact pieces are in the form of bushings for coupling elements, which are connected to the drive device, of the lever drive, and in which case each lever drive has a two-armed direction-changing lever, whose rotary bearing is supported via the insulating post on the casing of the switch enclosure.

This embodiment of the circuit breaker thus provides for the tubular configuration of the switch enclosure to be modified as little as possible, and for the components in the circuit breaker to be assigned to individual surface-mounted enclosures. These enclosures are connected at the ends to the switch enclosure, in the horizontal direction. Thus, nothing adds to the height of the switch, which is advantageous for maintenance work. The end arrangement of the surface-mounted enclosures is linked to the circuit breaker poles being supported on the casing side, and the drive device is arranged on the casing side. Support for the circuit breaker poles on the casing side is combined with the power transmission movement of the lever drives of the drive device, such that the drive device can be arranged underneath the switch enclosure. Hence they do not occupy any space beyond the installation area of the switch enclosure.

In one embodiment, the compactness of the configuration is assisted if the two surface-mounted enclosures which are arranged on the two ends of the switch enclosure, each of which have a first connecting flange facing the switch enclosure and a second connecting flange, arranged coaxially with respect to the first and facing away from the switch enclosure, are configured such that the second connecting flange of at least one of the two surface-mounted enclosures has a diameter which is less than the diameter of the first connecting flange. These surface-mounted enclosures are then used as adapters from the relatively large external diameter of the switch enclosure to further surface-mounted enclosures which, as a rule, may have a smaller external diameter. At least one of the inductors may in this case be in the form of a current transformer module, as is known per se from DE-U-298 06 652.

The insulating posts are supported on the casing of the switch enclosure, in another embodiment of the invention, for the pole elements which include the moving contact pieces in that these insulating posts are placed on a transverse member. The member is supported on the casing of the switch enclosure in the region of the mounting flange. In order to allow the coupling elements (which pass through the insulating posts) of the lever drives to be associated with a common drive, the coupling elements are preferably connected in a hinged manner, underneath the then transverse member, to a yoke, which is connected via a drive rod to the drive device.

It is preferable to allow the direction of the power flow to be changed from the vertically running coupling elements to the horizontally running drive rods of the moving contact pieces of the circuit breaker poles, with the aid of the two-armed direction-changing levers, while saving as much space as possible, the lever arm of the direction-changing lever which is on the output-drive side is connected, in a hinged manner via a coupling element (which is mounted such that it can pivot) to an axially guided coupling element which is guided such that it can slide in the movement direction of the moving contact pieces, and is coupled to the moving contact piece.

In order to ensure that the electrical field inside the switch enclosure is not influenced any more than necessary by the lever drive, it is preferable to form each pole element which includes a moving contact piece as an enclosure, which surrounds the direction-changing lever and the axially guided coupling element and is fitted on the associated insulating post, and in whose wall the respective direction-changing lever is mounted. Such an enclosure can be provided with an external contour, which takes account of the desired profile of the electric field.

In the case of high-voltage circuit breakers, two pole elements of a circuit breaker pole are mechanically connected to one another via an insulating tube forming an insulating spacer. In one embodiment of the invention, such an insulating tube can be replaced by at least one rod running parallel to the axis of the pole elements. This is possible since the spacer carries out a load-bearing function to a minor extent, since the pole elements are radially supported on the casing of the enclosure. The configuration of the spacer as one or two rods makes it easier to arrange the circuit breaker poles in as small an area as possible.

The configuration of the circuit breaker poles and of the drive movement for the moving contact pieces may also be used for single-phase-encapsulated circuit breakers. Since the switch enclosure includes one circuit breaker pole, there is no need to use a transverse member or a yoke in the region of the drive movement.

FIG. 1 shows a view of a high-voltage circuit breaker. The switch enclosure 11 is partially cut away in order to show the drive movement for transmitting power from a drive device to the moving switching contact of a circuit breaker pole. The switch enclosure 11 is preferably tubular in shape, and is arranged on a frame 2. The horizontally arranged switch enclosure is provided at both its ends with connecting flanges 14 and 15, to which a first surface-mounted enclosure 12 and a second surface-mounted enclosure 13 are flange-connected. The surface-mounted enclosures 12 and 13 have first connecting flanges 16 and 17 as well as second connecting flanges 18 and 19, in which case the diameter d of the second connected flanges 18 and 19 is chosen to be less than the diameter D of the first connecting flanges 16 and 17. One or both surface-mounted enclosures may be in the form of current transformer modules, as is known from German Utility Model Specification 298 05 944 U, and for this purpose accommodate current transformers which are provided with secondary connections 20.

The switch enclosure 11 is also provided in the region of its casing surface 10 with a mounting flange 21, to which the drive device 22 is flange-connected. The latter has a drive enclosure 23 with a connection bracket 24, and a drive enclosure 25 which is attached to the connecting bracket and in which a spring drive 26 with a making and breaking spring is located. The spring drive 26 is connected in a hinged manner via a coupling rod (not shown) to one arm of a two-armed direction-changing lever 27. The other arm of the direction-changing lever is connected in a hinged manner via a coupling rod 28 to a lever 29, which is seated on a direction-changing shaft 30 mounted in the drive enclosure 23. Another direction-changing lever 29' is seated on the direction-changing shaft 30 in the interior of the drive enclosure, and the vertically running drive rod 31 is connected to it, in a hinged manner. The drive rod is fitted—as will be explained in more detail later with reference to FIG. 2—with a yoke 3, to which three vertically running coupling elements 32 are fitted. One of the coupling elements acts on one drive rod of the three circuit breaker poles arranged in the switch enclosure 11. For this purpose, the respective coupling element 32 is connected in a hinged manner to the one arm of a two-armed direction-changing lever 33, to whose other arm a further coupling element 34 is connected in a hinged manner. The other end of the coupling element 34 is mounted such that it can pivot on the first pole element 41 of a circuit breaker pole and is guided axially there—as will be described later with reference to FIG. 4—and is connected in a hinged manner via an axially guided coupling element 35 to the drive rod 38 of a moving switching contact 6.

Figure 2:
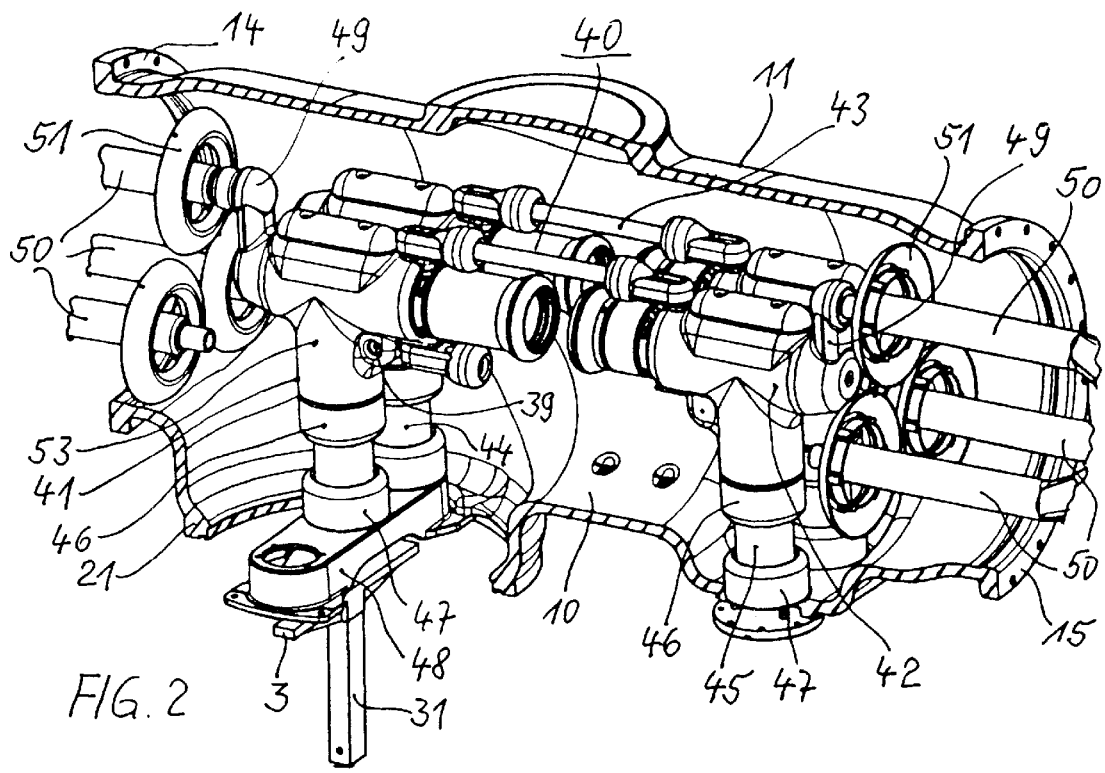
FIG. 2 shows a perspective view of two of three circuit breaker poles arranged in a switch enclosure.

As shown in FIG. 2, three circuit breaker poles 40 are arranged side by side in a horizontal plane in the switch enclosure 11, although only two circuit breaker poles are shown in this figure. Each circuit breaker pole has a first pole element 41 and a second pole element 42, which are mechanically connected to one another by insulating spacers 43 in the form of insulating rods. An electrical conductor 50 is connected to each pole element, with L-shaped conductor elements 49 being provided for the transition from the respective pole element to an electrical conductor. While the circuit breaker poles are arranged in a plane side by side, the electrical conductors 50 are arranged in a triangular shape.

The pole elements 41 and 42 are supported in the casing region of the switch enclosure 11 via insulating posts 44 and 45, respectively, which are each provided at their high-voltage end and at their enclosure end with a field control elements 46 and 47, respectively. The insulating post 44 for the first pole elements make contact with a transverse member 48 which is supported on the switch enclosure 11 in the region of the mounting flange 21. The insulating posts 45 of the second pole elements are each supported individually in the casing region of the switch enclosure 11. In this case, the pole elements 41 and 42 and the insulating posts 44 and 45, as well as the control elements 46 and 47, are each formed identically. If the circuit breaker poles are arranged in a triangular shape, the insulating posts and coupling elements of different length would have to be used.

Figure 4:
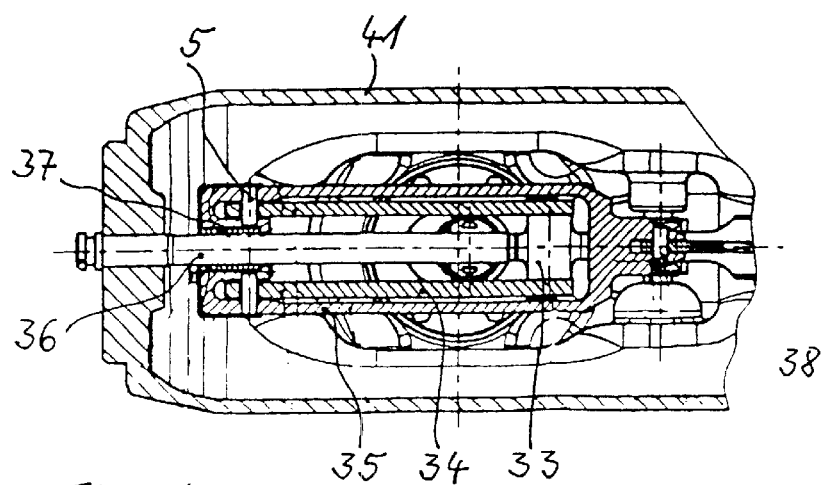
FIG. 4 shows the coupling of the direction-changing lever, which is mounted in one pole element, to the switching rod of a circuit breaker pole.
Figure 3:
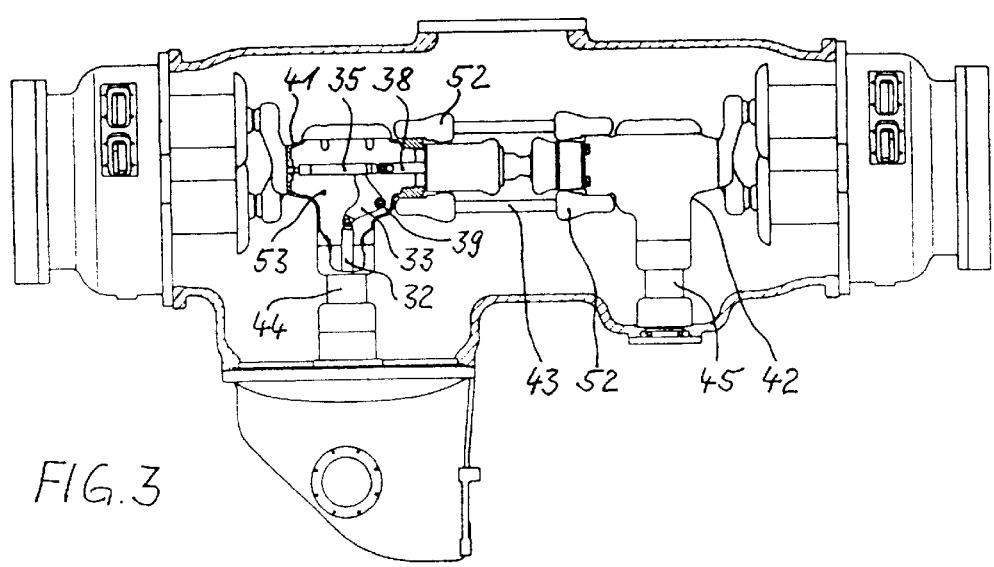
FIG. 3 shows a longitudinal section through the central circuit breaker pole.

The transverse member 48 has an associated yoke 3, which is located at the end of the drive rod 31. The yoke 3 is fitted with the coupling element 32 of which, as shown in FIG. 3, one in each case extends through a hollow insulating post 44 and is connected in a hinged manner to the one arm of the direction-changing lever 33. The two-armed lever 33 is mounted via a shaft 39' in the wall 53 of the first pole element 41, which is formed like an enclosure. The other arm of the direction-changing lever 33 is connected in a hinged manner to a coupling element 34 which is like a flap, can pivot and, as shown in FIG. 4, is mounted via bushes 52 on a coupling element 35 which is like a fork and is guided axially. The axially guided coupling element 35 is seated via a sliding bush 37 on a guide rod 36, which is attached to the first pole element 41, which is like an enclosure, and extends horizontally inside this pole element. The drive rod 38 is connected in a hinged manner to the other end of the axially guided coupling element 35, which is arranged on the guide rod such that it can slide, and is used to move the moving switching contact 6 (see FIG. 1) of the circuit breaker pole.

FIG. 3 also shows the rod-like insulating spacers 43, which have associated screening electrodes 52 at their ends.

Figure 5:
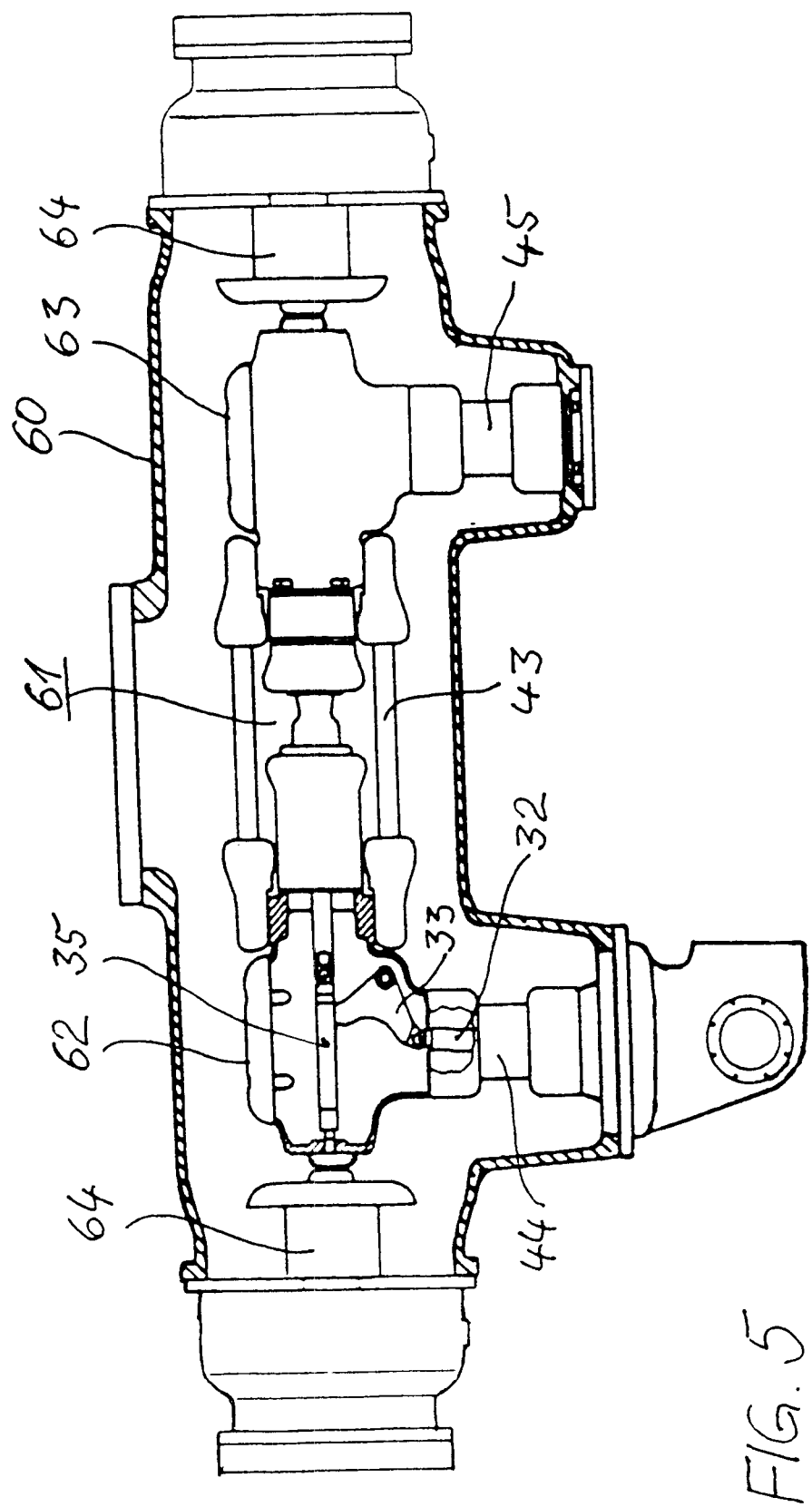
FIG. 5 shows a single-phase-encapsulated circuit breaker.

The circuit breaker as shown in FIG. 5 is constructed similar identically to the circuit breaker shown in FIGS. 1 to 4. The major difference is that the switch enclosure 60 includes one circuit breaker pole 61, whose pole elements 62 and 63 are each connected to an axially running electrical conductor 64. There is no need for any transverse member to support the pole element 62 on the casing of the switch enclosure, so that it can be supported in a similar way to that in the pole element 63 is supported. Furthermore, there is no need for any yoke in order to couple the coupling element 32 to the drive rod (part 31 in FIG. 1).

What is claimed is:

1. Three-phase-encapsulated high-voltage circuit breaker with a horizontal configuration, in which three circuit breaker poles are arranged side by side within a tubular switch enclosure, comprising:

two pole elements which are arranged insulated from a switch enclosure and a first pole element, which is supported in an insulating manner on the switch enclosure, and is fitted with a moving contact piece and a second pole element is fitted with a stationary contact piece;

moving contact pieces of the circuit breaker poles have an associated common drive device, which is arranged outside the switch enclosure and is coupled via separate lever drives to the moving contact pieces; and surface-mounted enclosures are provided in the region of ends of the switch enclosure, through which surface-mounted enclosures current feeders to the circuit breaker poles are passed, wherein the two ends of the switch enclosure are each provided with a connecting flange for horizontal connection of a surface-mounted enclosure, the drive device is arranged on the casing surface of the switch enclosure and is attached to a mounting flange in the casing region of the switch enclosure, each pole element of the circuit breaker pole is supported via in each case one insulating post on the casing of the tubular switch enclosure, and the insulating posts for the pole elements which include the moving contact pieces are in the form of bushings for coupling elements, which are connected to the drive device, of the lever drive, each lever drive has a two-armed direction-changing lever, whose rotary bearing is supported via the insulating post on the casing of the switch enclosure.

2. The high-voltage circuit breaker according to claim 1, in which each surface-mounted enclosure has a first connecting flange facing the switch enclosure and a second connecting flange facing away from the switch enclosure, wherein the second connecting flange of at least one of the two surface-mounted enclosures has a diameter which is less than the diameter of the first connecting flange, and the surface-mounted enclosure is in the form of a current transformer module.

3. The high-voltage circuit breaker according to claim 1, wherein the insulating posts for the pole elements which include the moving contact pieces are fitted to a transverse member which is supported on the casing of the switch enclosure in the region of the mounting flange.

4. The high-voltage circuit breaker according to claim 3, wherein the coupling elements of the lever drives are connected in a hinged manner, underneath the transverse member, to a yoke, which is connected via a drive rod to the drive device.

5. The high-voltage circuit breaker according to claim 4, wherein each coupling element is connected in a hinged manner to one of the two lever arms, and the other of the two lever arms is connected in a hinged manner via a coupling element, which is mounted such that it can pivot, to an axially guided coupling element, the axially guided coupling element guided such that it can slide in the movement direction of the moving contact piece, and is coupled to the moving contact piece.

6. The high-voltage circuit breaker according to claim 5, wherein each pole element which includes a moving contact piece is in the form of an enclosure, which surrounds the direction-changing lever and the axially guided coupling element and has a wall in which the respective direction-changing lever is mounted, and which is fitted on the associated insulating post.

7. The high-voltage circuit breaker according to claim 1, wherein the pole elements which include a stationary contact piece are of identical construction to the pole elements which include a moving contact piece.

8. The high-voltage circuit breaker according to claim 1, wherein the pole elements of one circuit breaker pole are mechanically connected to one another by an insulating spacer, the insulating spacer comprises at least one rod which is parallel to the axis of the pole elements.

9. The high-voltage circuit breaker according to claim 1, further comprising: a conductor element fitted to each pole element and provides the transition from the current connections of the pole elements to current feeders, which are arranged in a triangular shape.

10. A single-phase-encapsulated high-voltage circuit breaker with a horizontal configuration, in which a circuit breaker pole which is arranged inside a tubular switch enclosure comprises:

two pole elements which are arranged insulated from the switch enclosure, one of the pole elements is fitted with a moving contact piece while the other pole element is fitted with a stationary contact piece, the moving contact piece of the circuit breaker pole has an associated drive device, which is arranged outside the switch enclosure, on its casing surface, and is attached to a mounting flange and is coupled, inside the switch enclosure, via a lever drive to the moving contact piece, wherein horizontally adjacent surface-mounted enclosures are provided on ends of the switch enclosure, through which surface-mounted enclosures the current feeders to the circuit breaker pole are passed, each pole element of the circuit breaker pole is supported via one insulating post on the casing of the tubular switch enclosure, the insulating post for the pole element which includes the moving contact pieces is in the form of a bushing for a coupling element, which is connected to the drive device, of the lever drive, each lever drive has a two-armed direction-changing lever whose rotary bearing is supported via the insulating post on the casing of the switch enclosure, and the coupling element is connected in a hinged manner to one of the lever arms of the two-armed direction-changing lever, while the other lever arm of the direction-changing lever is connected in a hinged manner via a coupling element, which is mounted such that it can pivot, to an axially guided coupling element, and the axially guiding coupling element is guided such that it can slide in the movement direction of the moving contact piece, and is coupled to the moving contact piece.

11. The high-voltage circuit breaker according to claim 10, wherein the pole element which includes the moving contact piece is formed as an enclosure which surrounds the direction-changing lever and the axially guided coupling element, and in whose wall the respective direction-changing lever is mounted, and which is fitted to the associated insulating post.

12. The high-voltage circuit breaker according to claim 10, wherein the pole element which includes the stationary contact piece is of identical construction to the pole element which includes a moving contact piece.

13. The high-voltage circuit breaker according to claim 10, wherein the pole elements of the circuit breaker pole are mechanically connected to one another by an insulating spacer in which case the insulating spacer comprises at least one rod which is parallel to the axis of the pole elements.

* * * * *